(12) United States Patent
Lee et al.

(10) Patent No.: US 6,759,672 B2
(45) Date of Patent: Jul. 6, 2004

(54) SYSTEM FOR AND METHOD OF READING OUT STORAGE PHOSPHOR SCREEN USING PULSED SEMICONDUCTOR LIGHT SOURCE ARRAY

(75) Inventors: Sang-Yoon Lee, Taejon (KR); Kun Jai Lee, Taejon (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 0 days.

(21) Appl. No.: 09/737,478

(22) Filed: Dec. 18, 2000

(65) Prior Publication Data

US 2001/0010364 A1 Aug. 2, 2001

(30) Foreign Application Priority Data

Feb. 2, 2000 (KR) .......................................... 2000-5226

(51) Int. Cl.[7] .............................................. G03B 42/02
(52) U.S. Cl. ...................................... 250/584; 250/581
(58) Field of Search ................................ 250/584, 581, 250/582, 585, 586, 588, 483.1, 458.1, 228; 356/236

(56) References Cited

U.S. PATENT DOCUMENTS

| 4,737,641 | A | * | 4/1988 | Lange et al. ............. 250/327.2 |
| 5,001,054 | A | * | 3/1991 | Wagner ........................ 435/14 |
| 5,266,803 | A | * | 11/1993 | Heffelfinger ................. 250/582 |
| 5,399,877 | A | * | 3/1995 | Carter et al. ................. 250/581 |
| 5,534,709 | A | * | 7/1996 | Yoshimoto et al. ......... 250/588 |
| 5,796,113 | A | * | 8/1998 | Nagli et al. ............... 250/483.1 |

\* cited by examiner

*Primary Examiner*—Constantine Hannaher
*Assistant Examiner*—Otilia Gabor
(74) *Attorney, Agent, or Firm*—Bacon & Thomas, PLLC

(57) ABSTRACT

A system for and method of reading out a storage phosphor screen (or a storage phosphor sheet or an imaging plate) sensitive to radiation is used to perform radiography by optically stimulating the storage phosphor screen to induce luminescence and acquire a digital image of a subject. A semiconductor light source array is used as a stimulating light source to which an optical fiber array consisting of a bundle of optical fibers having diverse forms is connected; a starting of the semiconductor light source array is controlled with an electric pulse; and a semiconductor light source array starting pulse for generating a stimulating light is interlocked with a photomultiplier tube for collecting a luminescence light signal induced from the storage phosphor screen by the stimulating light to represent the collected luminescence light as a distribution of a two-dimensional position and thereby acquire the digital image of the subject from the storage phosphor screen.

7 Claims, 4 Drawing Sheets

SYSTEM FOR AND METHOD OF READING OUT STORAGE PHOSPHOR SCREEN USING PULSED SEMICONDUCTOR LIGHT SOURCE ARRAY

BACKGROUND OF THE INVENTION

1. Field of the Invention

The present invention relates to a computerized radiography device, and more particularly, a system for and method of reading out a storage phosphor screen using a pulsed semiconductor light source array which can be applied to a radiation diagnostics system, a dental radiation diagnostics system, an auto-radiography system, a image detection system by an electron microscope, a radiation diffraction image detection system, and a fluorescence detection system for life science analysis, which all use a storage phosphor screen (or a storage phosphor sheet or an imaging plate).

2. Description of the Related Art

A radiation sensor used in a radiography system employing a storage phosphor screen is constructed in such a fashion that a microcrystalline film made of bromine barium fluoride (BaFBr:X, X is halogen) as a luminescent material is coated in the thickness of approximately 80–150 $\mu$m on a polyester film having a thickness of approximately 150 $\mu$m, and then the coated microcrystalline film is covered with an approximately 10 $\mu$m thick polyethylene terephthalate film. When such a luminescent film is irradiated by radiation, energy of radiation which has transmitted an examination subject is stored and recorded on the storage phosphor material while forming a latent image. At this time, when the storage phosphor material on which the latent image is formed is illuminated by a micro light source of a specific wavelength band, a photo-stimulated luminescence according to the stored radiation energy is generated. There is well-known a radiation diagnostics system in which the illuminating position of the micro light source and the intensity of the luminescence light are converted into a digital signal for reconfiguration so that a digital image signal is produced, then the digitized image is processed further in a computer, following which a radiological image is produced on a display unit such as a monitor or a recording material such as a photographic film and the like (see Japanese patent laid-open publication Nos. Sho 55-12429, Sho 55-116340, Sho 55-163472, Sho 56-11395, etc.).

There is also well known an image detection system by an electron microscope in which the identical photo-stimulatible phosphor is used as a radiation detecting material, and after a material which is granted a radioactive mark is charged into a living body, by using the living body or a part of a tissue of the living body as a specimen, a storage phosphor screen on which the phosphor layer is formed is overlapped with the specimen during a certain period of time so that radiation energy is stored and recorded in the phosphor layer. At this time, the storage phosphor screen is scanned by illumination of a light source of a specific wavelength band (633 nm or 635 nm) so that an image of the living body's tissue is detected. Further, a radiation diffraction image detection system is well known in which a structure analysis of the specimen, etc. is conducted (see Japanese patent laid-open publication Nos. Sho 61-51738, Sho 61-93538, Sho 59-15843, etc.).

Unlike a case of using a conventional photographic film, a system employing such a storage phosphor screen as an image detecting element has several advantages in that it eliminates the necessity of a chemical process such as development of a photographic film, and an acquired image material experiences an image process so that both reproduction and quantitative analysis of an image for a specific portion are possible.

In addition, in an auto-radiography system, a fluorescence detecting system is well known which substitutes a fluorescent material for the radioactive mark material. According to such a fluorescence detecting system, the readout of a fluorescent image allows evaluation and analysis for a gene arrangement, a revelation phase of a gene, the path of metabolism and absorption, excretion, the state of charged material, separation, classification or molecular weight, and properties of a protein in an experimental mouse. For example, after a fluorescent pigment is applied to a solution containing a lot of pieces of DNA, the DNA pieces undergo cataphoresis properly following a gel support, or the DNA pieces undergo cataphoresis following the gel support having the fluorescent pigment contained therein and the gel support being immersed in a solution containing the fluorescent pigment. Then, after the DNA pieces that have undergone the cataphoresis are marked, the fluorescent pigment is stimulated by a micro light of a specific wavelength (488 nm) so that fluorescence is generated from the samples like the DNA pieces. An image is formed through the detection of the generated fluorescence, and analysis of DNA arranged on the gel support is possible. Such a fluorescence detecting system has advantages in that the necessity of using a radioactive material is eliminated and it is possible to simply detect a gene arrangement.

Like this, there is well known a conventional readout technology which has been proposed to acquire distribution of a two-dimensional position of a luminescence light signal from a storage phosphor by using a radioactive material or a fluorescent material as a radioactive label material. The conventional readout technology is classified into five following methods:

(i) a method in which a storage phosphor screen is scanned in the X-axis direction by a laser beam through a reflection mirror with the phosphor screen being moved in the Y-axis direction to acquire the distribution of a two-dimensional position (see U.S. Pat. No. 4,973,134, etc.).

(ii) a method in which a storage phosphor screen which is fixed is scanned in the X and Y-axis directions by a laser beam through two reflection mirrors, and a luminescence signal is collected in a photomultiplier tube by another reflection mirror to acquire the distribution of a two-dimensional position (see U.S. Pat. No. 5,124,558, etc.).

(iii) a method in which a screen is fixed and a readout head composed of a laser light source and a collection lens is moved in the X and Y-axis directions to acquire the distribution of a two-dimensional position.

(iv) a method in which an image detection material including a disk type storage phosphor (also referred to storage phosphor disk) like a CD-ROM is proposed, and the rotatable storage phosphor disk is read out by the same principle as that of CD-ROM to acquire the distribution of a two-dimensional position (see U.S. Pat. No. 5,144,135, etc.).

(v) a method in which a position-sensitive photosensor such as ICCD (Intensified Charged Coupled Device) or PSPMT (Position Sensitive Photomultiplier) and the like is substituted for a single photomultiplier applicable to a general storage phosphor screen readout apparatus, and a xenon arc lamp or a halogen flash lamp coupled to a beam homogenizing filter is used as a simulating light source to acquire the distribution of a two-dimensional image position (see U.S. Pat. No. 5,864,146, etc.).

In the above conventional prior art, a monochromatic laser as a point light source and a line source is used for photostimulation of a storage phosphor screen (or an image carrier such as a storage phosphor sheet or an imaging plate or a gel support or a transcription support, etc.), and a method is employed in which a light stimulating section or a light collecting section is moved in the X and Y axis directions to acquire the distribution of two-dimensional position, thus a long time readout is necessary to obtain a suitable resolution. On the contrary, in the case of using a position-sensitive light collecting device, since the xenon arc lamp or the halogen flash lamp as the light stimulating section is used in parallel with an optical filter or the beam homogenizing filter, a physical movement of the device becomes unnecessary so that a time required for the readout is reduced. However, the prior art has a limitation in a spatial resolution and a manufacturing cost of the device is expensive.

Moreover, the radiation diagnostics system, the auto-radiography system, the image detection system by an electron microscope, the radiation diffracted image detection system, and the fluorescence detection system use such a storage phosphor screen as an image detecting medium. Since these systems scan a storage phosphor element bearing an image with an excitation light, detect luminescence from the image carrier to produce an image, and perform a diagnosis or detection, the storage phosphor screen readout device is preferably constructed to use a tunable wavelength, if necessary.

SUMMARY OF THE INVENTION

Therefore, the present invention has been made in view of the above-mentioned problems, and it is an object of the present invention to provide a system for and method of reading out a storage phosphor screen in which a wavelength of a readout light can be varied easily by a wavelength-tunable light source, which eliminate vibration and noise according to a conventional storage phosphor screen readout method allowing physical circulation on the X-Y axis of a light source, and which enable a high readout operation and acquisition of a high quality image by using an electrically controllable photostimulation method and can be implemented at a low price.

According to one aspect of the present invention, there is provided a method of reading out a storage phosphor screen (or an image carrier such as a storage phosphor sheet or an imaging plate and the like) which is sensitive to radiation and is applicable to an industrial non-destructive inspection system, a medical radiation diagnostics system, a dental radiation diagnostics system, an auto-radiography system, a image detection system by an electron microscope, a radiation diffracted image detection system, and a fluorescence detection system for life science analysis and the like, comprising the steps of:

optically stimulating the storage phosphor screen to induce luminescence according to a response to radiation to acquire a digital image of a subject from the storage phosphor screen by using a semiconductor light source array as a stimulating light source to which an optical fiber array consisting of a bundle of optical fibers having diverse forms is connected;

controlling a starting of the semiconductor light source array with an electric pulse; and interlocking a semiconductor light source array starting pulse for generating a stimulating light with a photo-multiplier tube for collecting a luminescence light signal induced from the storage phosphor screen by the stimulating light to represent the collected luminescence light as distribution of a two-dimensional position to acquire the digital image of the subject from the storage phosphor screen.

According to another aspect of the present invention, there is also provided a system for reading out a storage phosphor screen (or an image carrier such as a storage phosphor sheet or an imaging plate and the like) which is sensitive to radiation and is applicable to an industrial non-destructive inspection system, a medical radiation diagnostics system, a dental radiation diagnostics system, an auto-radiography system, a image detection system by an electron microscope, a radiation diffracted image detection system, and a fluorescence detection system for life science analysis and the like, comprising:

a storage phosphor screen adapted to form a latent image of a subject as a radiation or a fluorescent material is irradiated to the subject or labeled;

an image processing computer adapted to control the starting of the storage phosphor screen readout system to read out the latent image of the subject formed on the storage phosphor screen, and to re-configure a collected image data to process the image so that an optimum image of the subject is produced;

a time interlocking signal processing module adapted to generate a main signal pulse having a certain period when the time interlocking signal processing module is supplied with a starting signal of the storage phosphor screen readout system from the image processing computer, to store the collected image data in a buffer included therein, and to transfer the image data collected and stored in the buffer to the image processing computer when one readout process is completed;

a semiconductor light source starting module adapted to generate a pulse for sequentially starting a semiconductor light source on the basis of the main signal pulse generated from the time interlocking signal processing module;

a semiconductor light source array including a plurality of semiconductor light sources which is started sequentially by the pulse generated from the semiconductor light source starting module to generate a stimulating light necessary for reading out the latent image of the subject formed on the storage phosphor screen;

a plurality of light transmitting lenses adapted to collect the stimulating light generated from the semiconductor light source array;

a stimulating light transmitting optical fiber adapted to allow the stimulating light passing through the plurality of light transmitting lenses to be transmitted;

an optical fiber array adapted to scan the storage phosphor screen with the stimulating light transmitted thereto through the stimulating light transmitting optical fiber, the optical fiber array being adapted to collect a luminescence light induced from the front surface of the storage phosphor screen through the scan of the storage phosphor screen by the stimulating light;

a collected light transmitting optical fiber adapted to allow the luminescence light collected by the optical fiber array to be transmitted;

a main photomultiplier tube adapted to collect, filter and multiply the luminescence light transmitted thereto from the optical fiber array through the collected light transmitting optical fiber;

a main photomultiplier tube starting module adapted to start the main photomultiplier tube, the main photomultiplier tube starting module being adapted to amplify and digitize a signal of the luminescence light collected by the main photomultiplier tube;

an auxiliary photomultiplier tube adapted to collect, filter and multiply a luminescence light induced from the rear surface of the storage phosphor screen through the scan of the storage phosphor screen by the stimulating light; and an auxiliary photomultiplier tube starting module adapted to start the auxiliary photomultiplier tube, auxiliary photomultiplier tube starting module being adapted to amplify and digitize a signal of the luminescence light collected by the auxiliary photomultiplier tube.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE EMBODIMENTS

Reference will now be made in detail to the preferred embodiments of the present invention.

Figure 1:
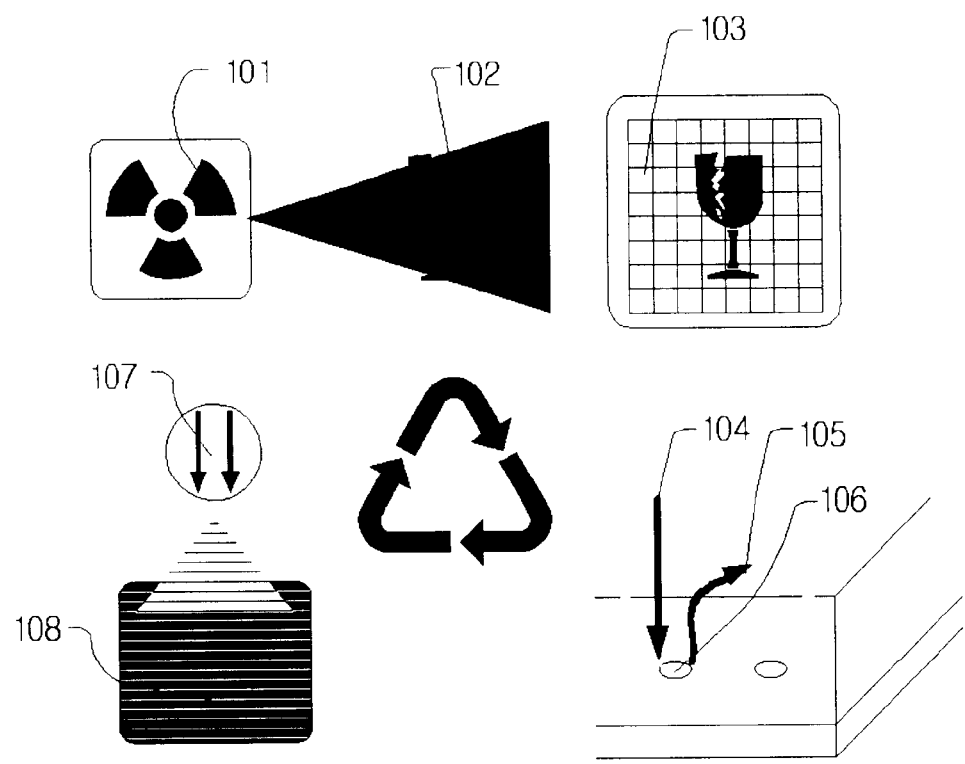
FIG. 1 is a schematic conceptional diagram illustrating a production, readout and re-use of a latent image in a radiography using a storage phosphor screen.

FIG. 1 is a schematic conceptional diagram illustrating a production, readout and re-use of a latent image in a radiography using a storage phosphor screen.

Prior to explanation of the present invention, a process of a general radiography or auto-radiography will be described hereinafter with reference to FIG. 1.

Referring to FIG. 1, the process includes the steps of: (a) irradiating or marking an examination subject (102) with a radiation generating source (101) or a fluorescent material; (b) forming a latent image of the subject (101) on a storage phosphor screen (103); (c) irradiating storage phosphor particles (106) embedded within the storage phosphor screen (103) with a luminescence stimulating light (104) of a specific wavelength band; (d) collecting an d amplifying a light stimulated luminescence (105) generated by the irradiation; (e) converting a luminescence signal into a digital signal for reconfiguration to acquire an image of the subject; and (f) exposing the storage phosphor screen to a high intensity white light source (107) when readout of the latent image for the storage phosphor screen is completed to allow the storage phosphor screen to be in a state (represented by reference numeral (108)) in which it can be used again. The storage phosphor screen can be used again approximately a hundred times without deterioration in performance.

The storage phosphor screen readout system of the present invention is used in the above steps (c), (d) and (e).

A preferred embodiment of the present invention will now be described hereinafter in detail with reference to the accompanying drawings.

Figure 2:
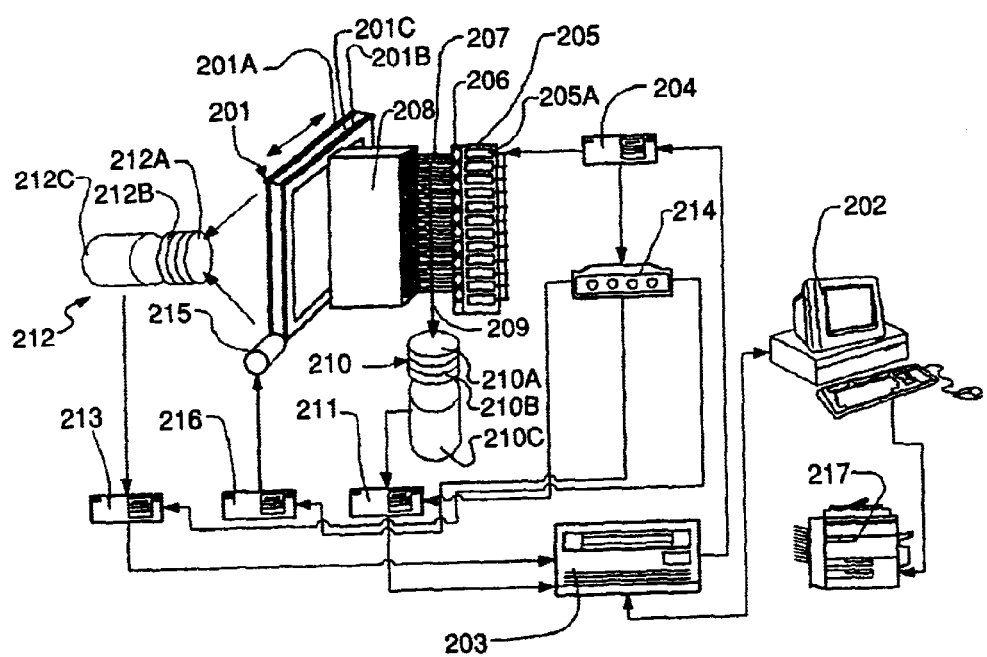
FIG. 2 is a schematic diagram illustrating a construction of a storage phosphor screen readout system according to a preferred embodiment of the present invention.

FIG. 2 is a schematic diagram illustrating a construction of a storage phosphor screen readout system according to a preferred embodiment of the present invention.

Referring to FIG. 2, there is shown the storage phosphor screen readout system including a storage phosphor screen (201), an image processing computer (202), a time interlocking signal processing module (203), a semiconductor light source starting module (204), a semiconductor light source array (205), a plurality of light transmitting lenses (206), a stimulating light transmitting optical fiber (207), an optical fiber array (208), a collected light transmitting optical fiber (209), a main photomultiplier tube (210), a main photomultiplier tube starting module (211), an auxiliary photomultiplier tube (212), and an auxiliary photomultiplier tube starting module (213).

The storage phosphor screen (201) is adapted to form a latent image of a subject as a radiation or a fluorescent material is irradiated to the subject or marked. The image processing computer (202) is adapted to control the starting of the storage phosphor screen readout system to read out the latent image of the subject formed on the storage phosphor screen, and re-configure a collected image data to process the image so that an optimum image of the subject is produced. The time interlocking signal processing module (203) is adapted to generate a main signal pulse having a certain period when the time interlocking signal processing module (203) is supplied with a starting signal of the storage phosphor screen readout system from the image processing computer (202), to store the collected image data in a buffer included therein, and to transfer the image data collected and stored in the buffer to the image processing computer (202) when one readout process is completed. The semiconductor light source starting module (204) is adapted to generate a pulse for sequentially starting a semiconductor light source on the basis of the main signal pulse generated from the time interlocking signal processing module (203). The semiconductor light source array (205) includes a plurality of semiconductor light sources (205A) which is started sequentially by the pulse generated from the semiconductor light source starting module (204) to generate a stimulating light necessary for reading out the latent image of the subject formed on the storage phosphor screen (201). The plurality of light transmitting lenses (206) is adapted to collect the stimulating light generated from the semiconductor light source array (205). The stimulating light transmitting optical fiber (207) is adapted to allow the stimulating light passing through the plurality of light transmitting lenses (206) to be transmitted to the optical fiber array (208). The optical fiber array (208) is adapted to scan the storage phosphor screen (201) with the stimulating light transmitted thereto through the stimulating light transmitting optical fiber (207), and to collect a luminescence light induced from the front surface (201A) of the storage phosphor screen (201) through the scan of the storage phosphor screen (201) by the stimulating light. The collected light transmitting optical fiber (209) is adapted to allow the luminescence light collected by the optical fiber array (208) to be transmitted to the main photomultiplier tube (210). The main photomultiplier tube (210) is adapted to collect, filter and amplify the luminescence light transmitted thereto from the optical fiber array (208) through the collected light transmitting optical fiber (209). The main photomultipler tube starting module (211) is adapted to start the main photomultiplier tube (210), and to amplify and digitize a signal of the luminescence light collected by the main photomultiplier tube (210). The auxiliary photomultiplier tube (212) is adapted to collect, filter and amplify a luminescence light induced from the rear surface (201B) of the storage phosphor screen (201) through the scan of the storage phosphor screen (201) by the stimulating light. And, the auxiliary photomultiplier tube starting module (213) is adapted to start the auxiliary photomultiplier tube (212), and to amplify and digitize a signal of the luminescence light collected by the auxiliary photomultiplier tube (212).

Also, the storage phosphor screen readout system may further include a stepping motor (215) adapted to move the storage phosphor screen (201) for the next readout process in the case where an area of the storage phosphor screen (201) is too large to complete a readout of the storage phosphor screen (201) at one readout process, and a stepping motor starting module (216) adapted to control a starting of the stepping motor (215).

In addition, in order to prevent superimposition of the luminescence light signal with the stimulating light signal and collect only a pure luminescence light signal induced by the stimulating light, the storage phosphor screen readout system may further include a time delay pulse generator (214) adapted to generate the starting pulses of the main and auxiliary photomultiplier tubes (210) and (212) and the starting pulse of the stepping motor (215) for application to the main and auxiliary photomultiplier tube starting modules (211) and (213) and the stepping motor starting module (216) through the interlocking with the semiconductor light source starting pulse generated from the semiconductor light source starting module (204). At this time, the time delay pulse generator (214) generates a main photomultiplier tube starting pulse at a falling edge of the semiconductor light source starting pulse, and generates an auxiliary photomultiplier tube starting pulse after a delay of a certain period of time since generation of the main photomultiplier tube starting pulse.

Figure 3:
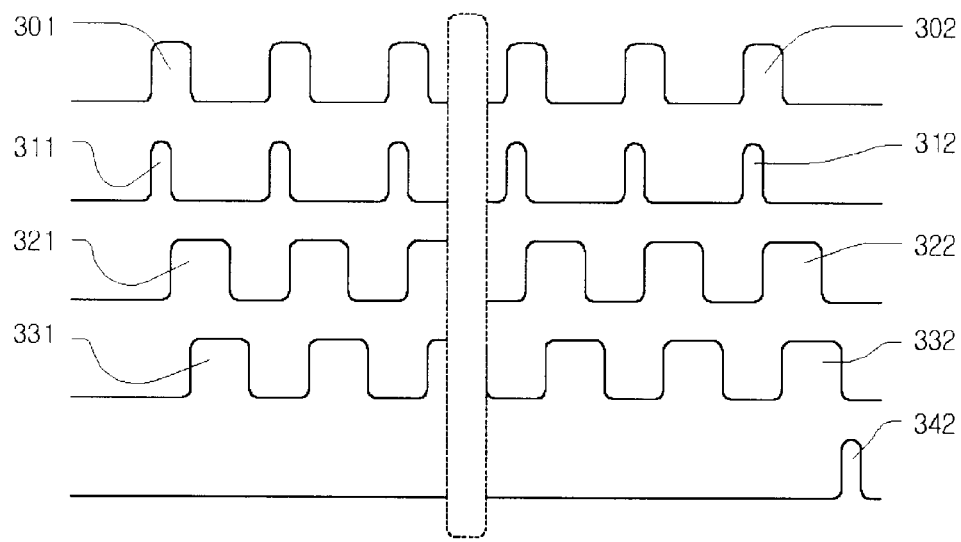
FIG. 3 is a schematic view illustrating a construction of starting time series of each module by a pulse distribution.

An operation of the storage phosphor screen readout system according to a preferred embodiment of the present invention will be described hereinafter in detail with reference to the construction of starting time series of each module by a pulse distribution of FIG. 3.

For readout of the storage phosphor screen (201), when a starting signal of the storage phosphor screen readout system is applied to the time interlocking signal processing module (203) from an image processing computer (202), the time interlocking signal processing module (203) generates a main signal pulse (301) with a certain period to apply a starting signal to the semiconductor light source starting module (204). As a result, the semiconductor light source starting module (204) generates a starting pulse (311) with a certain period for the semiconductor light source array (205) to sequentially start the plurality of semiconductor light sources (205A) of the semiconductor light source array (205), respectively.

A stimulating light generated from the semiconductor light source array (205) is transmitted to the optical fiber array (208) through the plurality of light transmitting lenses (206), and then the stimulating light transmitting optical fibers (207). The stimulating light transmitted to the optical fiber array (208) from the semiconductor light source array (205) stimulates a luminescent element layer (201C) formed within the storage phosphor screen (201) by scanning the storage phosphor screen (201) to induce luminescence.

The luminescence light generated from the front surface (201A) of the storage phosphor screen (201) is collected by the light transmitting optical fiber (209) of the optical fiber array (208) to transmit the collected luminescence light to a main photomultiplier tube (210C) through a collection lens (210A) and an optical filter (210B). In the meantime, the luminescence light generated from the rear surface (201B) of the storage phosphor screen (201) is transmitted to an auxiliary photomultiplier tube (212C) through a collection lens (212A) and an optical filter (212B).

The starting pulse signals of the main and auxiliary photomultiplier tubes (210) and (212) are generated by the time delay pulse generator (214) coupled to the semiconductor light source starting module (204), and a starting pulse (321) of the main photomultiplier tube (210) is generated temporally at a falling edge of the semiconductor light source starting pulse (311). Further, a starting pulse (331) of the auxiliary photomultiplier tube (212) is generated after a delay of a certain period of time when compared with the starting pulse (321) of the main photomultiplier tube (210) in consideration of a movement of the luminescence light generated from the front surface (201A) to the rear surface (201B) of the storage phosphor screen (201) and a collision between luminescence lights generated from the front surface (201A) and the rear surface (201B) of the storage phosphor screen (201). The starting pulse signal generated from the time delay pulse generator (214) is applied to the main photomulipier tube starting module (211) and the auxiliary photomultipler tube starting module (213) which collect, amplify a signal of the luminescence light according to an input pulse signal to digitize it so that the superimposition of the luminescence light with the stimulating light can be prevented and only a pure luminescent light can be collected.

If the time delay pulse generator (214) is not used, the starting pulse will be able to be supplied to the main and auxiliary photomulipier tube starting modules (211 and 213) by the time interlocking signal processing module (203) in place of the time delay pulse generator (214).

The luminescence light signal collected and digitized by the main and auxiliary photomulipier tube starting modules (211 and 213) is applied to the time interlocking signal processing module (203) for collection, and then is stored in a buffer embedded therein. When a signal processing operation according to generation of a final pulse (302) of the main signal pulse (301) generated from the time interlocking signal processing module (203) is completed, the stepping motor starting module (216) generates a pulse signal (342) for starting the stepping motor (215) to allow the storage phosphor screen (201) to be moved in the X-axis direction. Accordingly, the image data collected and stored in the buffer memory of the time interlocking signal processing module (203) is transmitted to the image processing computer (202), and simultaneously, the next readout process begins.

When such as readout process is completed, the image processing computer (202) re-configures the collected and stored image data to display an optimum image of the subject through an image processing, and an end user can print the displayed image in a desired medium form through a image printer (217) connected to the image processing computer (202).

Figure 4:
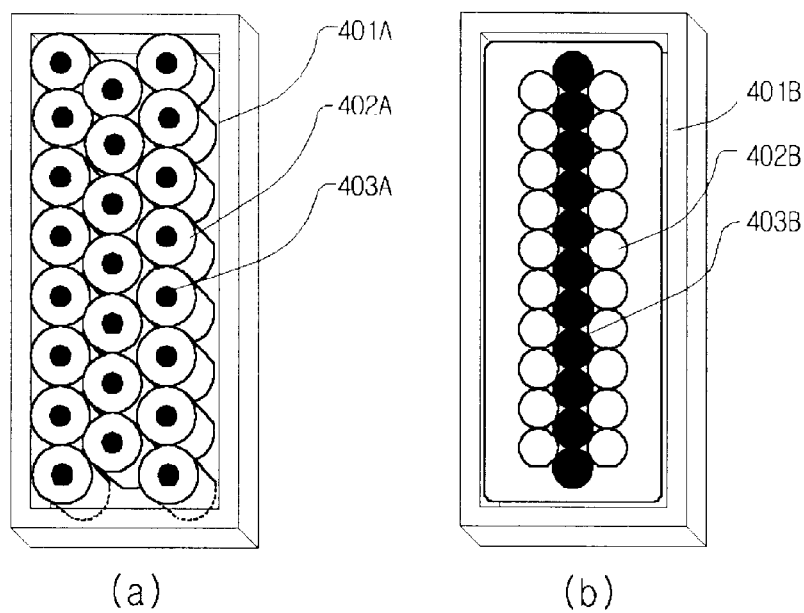
FIG. 4 is a schematic view illustrating a construction of an optical fiber array for a scan of the storage phosphor screen by a stimulating light and a collection of the luminescence light.

FIG. 4 is a schematic view illustrating a construction of an optical fiber array for a scan of the storage phosphor screen by a stimulating light and a collection of the luminescence light.

In the storage phosphor screen according to a preferred embodiment of the present invention, the optical fiber array (208) for a scan of the storage phosphor screen (201) by a stimulating light and a collection of the luminescence light can be constructed as shown in FIG. 4.

In FIG. 4(a), there is shown a construction of the optical fiber array (401A) suitable for a storage phosphor screen readout system requiring a high speed readout operation of a low resolution. The optical fiber array (401A) can be constructed in such a fashion that each of a plurality of luminescence light collecting optical fibers (402A) surrounds each of a plurality of stimulating light scanning optical fibers (403A) integrally with the plurality of luminescence light collecting optical fibers (402A) being arranged to be in contact with each other in at least one row.

In FIG. 4(b), there is shown a construction of the optical fiber array (401B) suitable for a storage phosphor screen readout system requiring a high resolution. The optical fiber array (403B) can be constructed in such a fashion that a stimulating light scanning optical fiber array (403B) is arranged in one row or two rows with a luminescence light collecting optical fiber array (402B) being arranged to be in contact with the circumference of both sides of the stimulating light scanning optical fiber array (403B), respectively.

Figure 5:
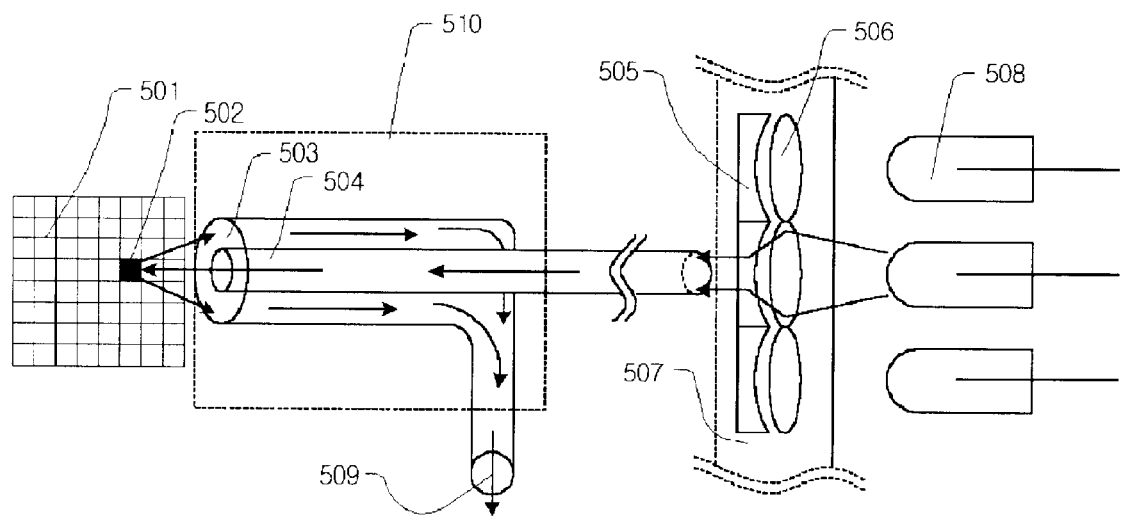
FIG. 5 is a schematic conceptional view illustrating photostimulation of and collection of the luminescence light from the storage phosphor screen using a semiconductor light source array, a collector lens and an optical fiber.

FIG. 5 is a schematic conceptional view illustrating photostimulation of and collection of the luminescence light from the storage phosphor screen using a semiconductor light source array, a collector lens and an optical fiber.

A concept on photostimulation of and collection of the luminescence light from the storage phosphor screen will now be described hereinafter with reference to FIG. 5.

As shown in FIG. 5, in the photostimulation of a storage phosphor screen (501) by an optical fiber array (510), a wavelength-tunable semiconductor light source (508) (a light emitting diode or a laser diode) allowing an electric variation of a wavelength generates a light having a wavelength of 633–635 nm in the case of a radiography system, and a light having a wavelength of 470–480 nm in the case of a fluorescence readout system, if necessary.

In the process of scanning the storage phosphor screen with a stimulating light, a stimulating light generated from the wavelength-tunable semiconductor light source (508) is collected by a scanning light collection lens (506) which, in turn, transmits the collected stimulating light to a parallel beam generating lens (505). Then, the stimulating light transmitted to the parallel beam generating lens (505) from the scanning light collecting lens (506) is incident on a stimulating light scanning optical fiber (504) in the form of a parallel light minimizing a reflection of a light to stimulate one point (502) of a latent image of a subject formed on the storage phosphor screen (501). As a result, a luminescence light generated by such photostimulation of the storage phosphor screen (501) is incident on a luminescence light collecting optical fiber (503) surrounding the stimulating light scanning optical fiber (504), and then is transferred to a photomultiplier tube along a collected light transmitting optical fiber of the optical fiber array (510).

Moreover, in the construction of the above optical fiber array, the necessity of disposing the stepping motor (215) for moving the storage phosphor screen and the stepping motor starting module (216) may be eliminated according to an area of the storage phosphor screen to be read out and a construction of the optical fiber array module. For example, in the case of a dental intraoral radiography system, it will be possible to directly read out the screen without moving it.

Figure 6:
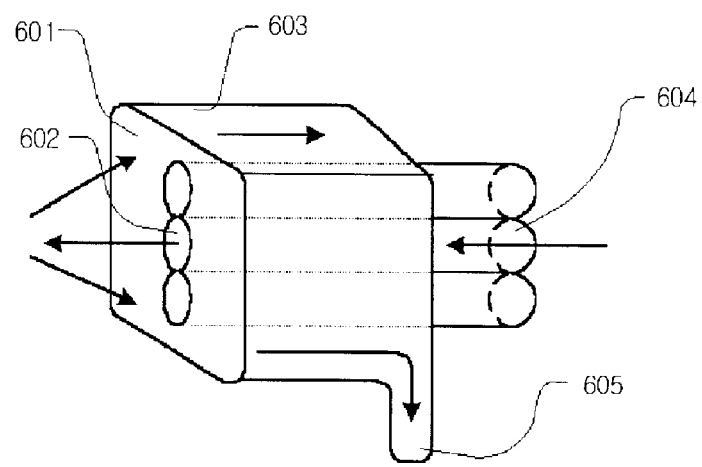
FIG. 6 is a schematic view illustrating a construction of an optical fiber array for improving resolution of an image and efficiency in collection of a luminescence light.

FIG. 6 is a schematic view illustrating a construction of an optical fiber array for improving resolution of an image and efficiency in collection of a luminescence light.

In the meantime, in the case where the position of a storage phosphor screen or an image carrier to be read out is fixed and a micro readout of a high resolution is required, for example, in the case of readout of a certain small pixel, like in the case of a fluorescence readout system for reading out fluorescence of a DNA chip, as shown in FIG. 6, an optical fiber array module (603) can be constructed in such a fashion that a stimulating light scanning optical fiber array (602) is arranged according to a desired position, and a luminescence light collecting optical fiber array (601) is disposed to surround the stimulating light scanning optical fiber array (602).

The present invention can be applied to an industrial non-destructive inspection system, a medical radiation diagnostics system, a dental radiation diagnostics system, an auto-radiography system, a image detection system by an electron microscope, a radiation diffracted image detection system, and a fluorescence detection system for life science analysis and the like by using a storage phosphor screen (or an image carrier such as a storage phosphor sheet or an imaging plate and the like) which is sensitive to radiation.

As can be seen from the foregoing, according to present invention, a wavelength-tunable semiconductor light source (a light emitting diode or a laser diode) array is used as a phosphor stimulating portion, and a storage phosphor screen can be read out by starting in order electrically output signals from a series of a light emitting body array in which a plurality of optical fibers are connected with each other, thereby shortening a readout time and improving a resolution of a readout image.

Moreover, vibration and noise according to a conventional storage phosphor screen readout method allowing physical circulation on the X-Y axis of a light source can be eliminated by moving the storage phosphor screen, but not a light source, if necessary.

Furthermore, since a wavelength-tunable semiconductor light source is used as a phosphor stimulating portion, a low-priced storage phosphor screen readout system can be implemented in which a wavelength of a readout light is varied easily according to the use of a radiography system.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A method of reading out an image carrier such as a storage phosphor screen, storage phosphor sheet, or imaging plate which is sensitive to radiation, comprising the steps of:

optically stimulating the image carrier to induce luminescence and acquire a digital image of a subject from the image carrier by using, as a stimulating light source, a semiconductor light source array including a plurality of semiconductor light sources arranged in an array and to which an optical fiber array consisting of a bundle of optical fibers is connected;

controlling a starting of the semiconductor light source array with an electric pulse; and interlocking the starting pulse for the semiconductor light source array with a photomultiplier tube for collecting a luminescence light signal induced from the storage phosphor screen by the stimulating light, and representing the collected light signal as a distribution of a two-dimensional position to acquire the digital image of the subject from the image carrier, wherein said plurality of semiconductor light sources are activated in a predetermined sequence to supply stimulating light to different said optical fibers and thereby scan the image carrier by stimulating different areas of the image carrier without physically moving said semiconductor light source array and bundle of optical fibers.

2. A system for reading out a storage phosphor screen which is sensitive to radiation, comprising:

a storage phosphor screen adapted to form a latent image of a subject irradiated or marked by a radiation source or a fluorescent material;

an image processing computer adapted to control starting of the storage phosphor screen readout system to read out the latent image of the subject formed on the storage phosphor screen, and to re-configure collected image data to process the image so that an optimum image of the subject is produced;

a time interlocking signal processing module adapted to generate a main signal pulse having a predetermined period during which the time interlocking signal processing module is supplied with a starting signal for the storage phosphor screen readout system from the image processing computer, to store the collected image data in a buffer included therein, and to transfer the image data collected and stored in the buffer to the image processing computer when one readout process is completed;

a semiconductor light source starting module adapted to generate a pulse for sequentially starting a semiconductor light source on the basis of the main signal pulse generated by the time interlocking signal processing module;

a semiconductor light source array including a plurality of semiconductor light sources started sequentially by the pulse generated by the semiconductor light source starting module to generate a stimulating light necessary for reading out the latent image of the subject formed on the storage phosphor screen;

a plurality of light transmitting lenses adapted to collect the stimulating light generated from the semiconductor light source array;

a stimulating light transmitting optical fiber adapted to allow the stimulating light passing through the plurality of light transmitting lenses to be transmitted;

an optical fiber array adapted to scan the storage phosphor screen with the stimulating light transmitting optical fiber, the optical fiber array being adapted to collect a luminescence light induced from a front surface of the storage phosphor screen through the scan of the storage phosphor screen by the stimulating light;

a collected light transmitting optical fiber adapted to allow the luminescence light collected by the optical fiber array through the collected light transmitting optical fiber;

a main photomultiplier tube starting module adapted to start the main photomultiplier tube, the main photomultiplier tube starting module being adapted to amplify and digitize a signal of the luminescence light collected by the main photomultiplier tube;

an auxiliary photomultiplier tube adapted to collect, filter and amplify a luminescence light induced from the rear surface of the storage phosphor screen through the scan of the storage phosphor screen by the stimulating light; and an auxiliary photomultiplier tube starting module adapted to start the auxiliary photomultiplier tube, auxiliary photomultiplier tube starting module being adapted to amplify and digitize a signal of the luminescence light collected by the auxiliary photomultiplier tube.

3. The system according to claim 2, further comprising a stepping motor adapted to move the storage phosphor screen for a next readout process when a readout of the storage phosphor screen is not completed in one readout process; and a stepping motor starting module adapted to control a starting of the stepping motor.

4. The system according to claim 3, wherein the storage phosphor screen readout system further comprises a time delay pulse generator adapted to generate starting pulses of the main and auxiliary photomultiplier tubes and the starting pulse of the stepping motor for application to the main and auxiliary photomultiplier tube starting modules and the stepping motor starting module through the interlocking with the semiconductor light source starting pulse generated by the semiconductor light source starting module, thereby preventing superimposition of the luminescence light signal with the stimulating light signal and collecting only a pure luminescence light signal induced by the stimulating light.

5. The system according to claim 2, wherein the semiconductor light source array varies a wavelength of a readout light.

6. The system according to claim 2, wherein the optical fiber array is constructed in such a fashion that each of a plurality of luminescence light collecting optical fibers surrounds each of a plurality of stimulating light scanning optical fibers integrally with the plurality of luminescence light collecting optical fibers being arranged to be in contact with each other in at least one row.

7. The system according to claim 2, wherein the optical fiber array is constructed in such a fashion that a stimulating light scanning optical fiber array is arranged in one row or two rows with a luminescence light collecting optical fiber array being arranged to be in contact with the circumference of both sides of the stimulating light scanning optical fiber array, respectively.

* * * * *